(12) United States Patent
Peana et al.

(10) Patent No.: US 11,199,744 B2
(45) Date of Patent: Dec. 14, 2021

(54) METHOD AND APPARATUS FOR ADJUSTING PIXEL CONTRAST TO ENABLE PRIVACY DISPLAY LEGIBILITY

(71) Applicant: DELL PRODUCTS, LP, Round Rock, TX (US)

(72) Inventors: Stefan Peana, Austin, TX (US); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/829,752

(22) Filed: Mar. 25, 2020

(65) Prior Publication Data
US 2021/0302787 A1    Sep. 30, 2021

(51) Int. Cl.
| | |
|---|---|
| G09G 3/36 | (2006.01) |
| G09G 3/34 | (2006.01) |
| G02F 1/13357 | (2006.01) |
| G02F 1/13 | (2006.01) |
| H04M 1/72463 | (2021.01) |
| G02F 1/1335 | (2006.01) |

(52) U.S. Cl.
CPC ...... *G02F 1/133606* (2013.01); *G02F 1/1323* (2013.01); *G02F 1/133611* (2013.01); *G09G 3/3426* (2013.01); *G09G 3/3659* (2013.01); *H04M 1/72463* (2021.01); *G02F 1/133601* (2021.01); *G02F 1/133618* (2021.01); *G02F 1/133626* (2021.01); *G09G 2358/00* (2013.01)

(58) Field of Classification Search
CPC . G09G 2358/00; G09G 3/3426; G09G 3/3659
See application file for complete search history.

(56) References Cited

U.S. PATENT DOCUMENTS

| | | | |
|---|---|---|---|
| 9,934,731 B2 | 4/2018 | Peana | |
| 2007/0129864 A1* | 6/2007 | Tanaka | B60K 37/06 701/36 |
| 2015/0138059 A1* | 5/2015 | Large | H04N 13/32 345/102 |
| 2019/0285948 A1 | 9/2019 | Peana et al. | |

* cited by examiner

*Primary Examiner* — Kevin M Nguyen
(74) *Attorney, Agent, or Firm* — Larson Newman, LLP (57) ABSTRACT

An information handling system includes a display device, a camera, and a processor. The camera captures an image including first and second observers in a field of view in front of the display device. Based on the captured image, the processor determines a first location of the first observer and a second location of the second observer. Based on the first and second locations, the processor determines a first set of pixels located within a primary field of view for the first observer, and a second set of pixels located within a second field of view for the second observer. The processor calculates a viewing legibility adjustment for the second set of pixels. Based on the viewing legibility adjustment, the processor adjusts a contrast ratio for the second set of pixels to below a viewing threshold level.

17 Claims, 6 Drawing Sheets

METHOD AND APPARATUS FOR ADJUSTING PIXEL CONTRAST TO ENABLE PRIVACY DISPLAY LEGIBILITY

FIELD OF THE DISCLOSURE

The present disclosure generally relates to information handling systems, and more particularly relates to an apparatus with an adjustable pixel contrast to enable privacy display legibility.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a display device, a camera, and a processor. The camera may capture an image including first and second observers in a field of view in front of the display device. Based on the captured image, the processor may determine a first location of the first observer and a second location of the second observer. Based on the first and second locations, the processor may determine a first set of pixels located within a primary field of view for the first observer, and a second set of pixels located within a second field of view for the second observer. The processor may calculate a viewing legibility adjustment for the second set of pixels. Based on the viewing legibility adjustment, the processor may adjust a contrast ratio for the second set of pixels to a ratio that is below a viewing threshold level.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
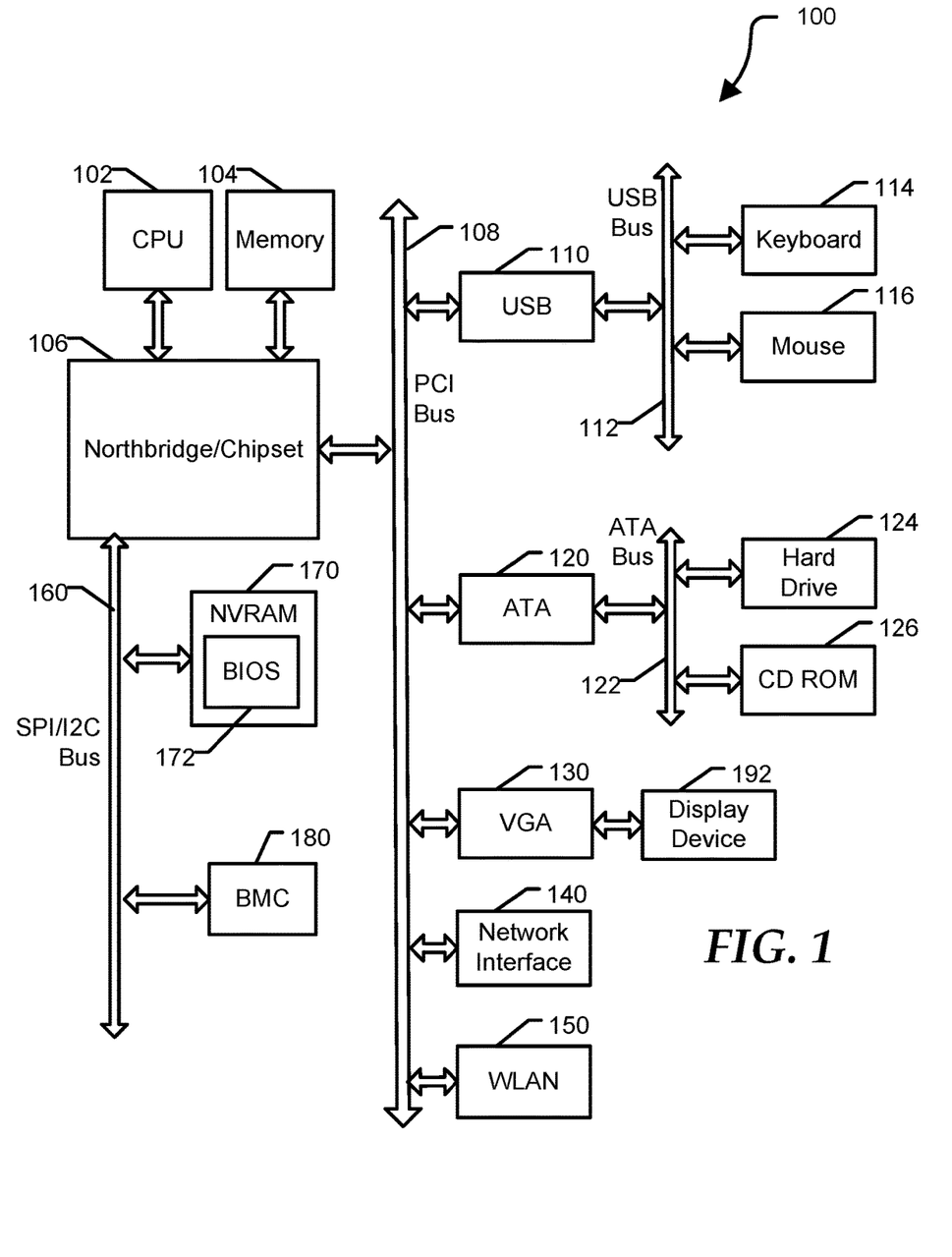
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 192 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
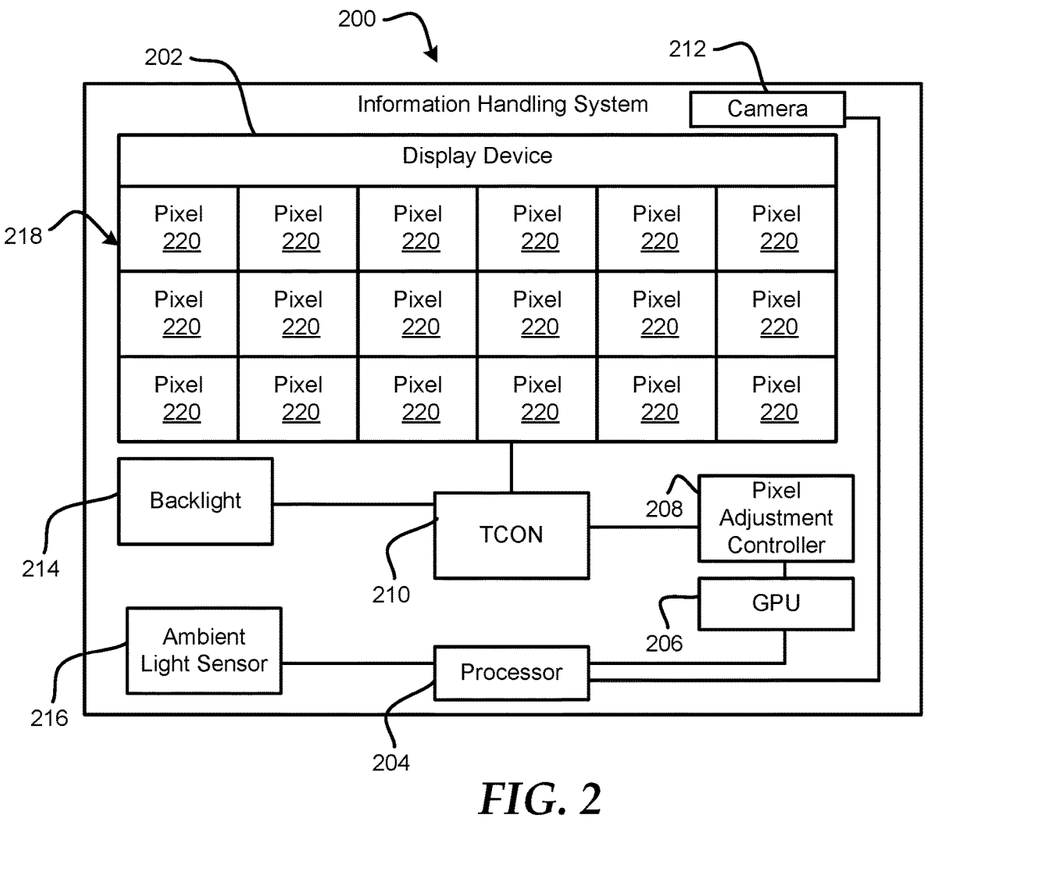
FIG. 2 is a diagram of a portion of an information handling system according to at least one embodiment of the disclosure.

FIG. 2 illustrates a portion of an information handling system 200 according to at least one embodiment of the current disclosure. Information handling system 200 includes a display device 202, a processor 204, a graphics processing unit (GPU) 206, a pixel adjustment controller 208, a timing controller (TCON) 210, a camera 212, global backlighting 214, and an ambient light sensor 216. Display device 202 includes multiple displays including a display 218, which in turn includes multiple pixels 202 for displaying an image to one or more individuals or observers of information handling system 200. Additionally, display device 202 may also include another display, such as display 300 of FIG. 3, on top of display 218. In an example, information handling system 200 may include additional components without varying from the scope of this disclosure. For example, information handling system 200 may include multiple display devices. In an example, each of pixels 220 may be or include a physical point in an image displayed by display device 202. For example, a single pixel 220 may be or include a smallest controllable element of an image represented via display device 202. For instance, display device 202 may convey information via pixels 220. In an example, display device 202 may emit light via pixels 220. For example, display device 202 may emit different colors of light via pixels 220. In one instance, a single pixel 220 may emit a single color. In another instance, a single pixel 220 may emit light at an intensity As shown, GPU 206 may be coupled to pixel adjustment controller 208, which in turn may be coupled to TCON 210. In another example, GPU 206 As illustrated, ICON 210 may be coupled to backlight segments 214 and pixels 220. In an example, ICON 210 may receive an image from CPU 206 and may provide first information to pixels 220 and second information to backlight segments 214. For example, TCON 210 may control backlight segments 214 based at least on an image from GPU 206. In certain examples, GPU 206 may be any suitable component including a processor containing circuitry to control the display of images on display 218 of display device 218. Similarly, pixel adjustment controller 208 may be any suitable component including a processor containing circuitry to control the brightness of different pixels 220 on display 218 of display device 218. In an example, ICON 210 may be any suitable component including a processor containing circuitry to control of images on display 218 of display device 218 via pixels 220 and backlight 214.

During operation of information handling system 200, different images may be provided by pixels 220 of display device 202. However, while a user, such as observer 410 of FIG. 4, of information handling system 200 may be able to see all of pixels 220 of display 218, the user may not want other individuals, such as observer 412 of FIG. 4, to be able to view images displayed on display device 202. Thus, the user may place display device 202 in a privacy mode or the display device may always operate in the privacy mode. In an example, a user of information handling system 200 may enable a privacy mode in any suitable manner including pushing a button, such as a physical button or soft button of the information handling system.

Previous information handling systems implemented privacy solutions for display devices in one of a number of different manners. For example, a privacy film, including louvers, may be placed on top of the display to change a light brightness distribution. In this example, the louver film would maximize light passing through at the center of the film while blocking light at angles beyond 30 degrees. Another previous privacy solution included a display liquid crystal angle control system that would utilize an electrical field to control a liquid crystal molecule tilt to change light distribution similar to the louver film. These and other previous privacy solutions controlled light distribution at fixed locations on the display. However, if the second individual or observer was located at a location so that portion of the display within this individual's field of view did not have a light distribution change, the second individual would be able to view the images on the display. Additionally, the previous privacy solutions also decrease the legibility of pixels within the field of view of the primary observer. Thus, information handling system 200 may be improved by display device 202 including components to dynamically adjustable legibility of different portions of display 218 based on a location of second observer, such as observer 412 of FIG. 4, without reducing legibility for a first or primary observer. Operations to dynamically adjustable legibility of different portions of display device 202 while be discussed with respect to FIGS. 2-5.

While information handling system 200 and display device 202 are operating in a privacy mode, camera 212 may be utilized in any suitable manner to determine whether multiple observers are looking at display 218 and the locations of the observers. For example, camera 212 may provide images to processor 204, and these images may include any number of observers of images on display device 202. Processor 204 may utilize the images from camera 212 to determine whether there are multiple observers. In response to multiple observers being determined, processor 204 may identify one of the observers as a primary observer and one or more other observers as secondary observers.

In response to the primary and second observers being identified, processor 204 may performed one or more operations to determine a field of view for the observers. In an example, if the primary observer is located directly in front of display device 202, processor 204 may determine that the primary field of view for the primary observer begins in the center of the display device and extends towards the edges of the display device a predetermined distance. In an example, processor 204 may utilize metadata associated with the captured image from camera 212 to determine or calculate a viewing angle for the second observer to display device 202. In certain examples, camera 212 may include multiple lens, which may be utilized to calculate a distance and angle the second observer is from display device 218. The calculated distance and angle may be provided to processor 204 as metadata for the captured image. Processor 204 may utilize the distance and angle of the second observer to calculate, via any suitable manner, a secondary field of view for the secondary observer.

In an example, processor 204 may determine a first set of pixels 220 on display device 202 within the primary field of view and determine a second set of the pixels within the secondary field of view. In certain examples, a contrast ratio for pixels of the second set of pixels may be dynamically reduced to decrease the legibility of an image on display device 202 within portions of the display device that are outside of the primary field of view, such as within the secondary field of view. Processor 204 may provide the identification of the first and second set of pixels to GPU 206 and/or TCON 210, which in turn may perform a dynamic legibility calculation for the pixels located within the secondary field of view.

In an example, GPU 206 and/or TCON 210 may perform the dynamic legibility calculation by one or more suitable operations. For example, GPU 206 and/or TCON 210 may determine a current contrast ratio for pixels 220 within the secondary field of view, and determine a legibility adjustment for the pixels to reduce the contrast ratio to a ratio below a threshold level. In an embodiment, a contrast ratio is a ratio of brightness to dark within a pixel. For example, the contrast ratio may be calculated by dividing a white level of a pixel by the black level of the pixel. In an embodiment, the black level may be set to a predetermined level that cannot be changed. Thus, GPU 206 and/or TCON 210 may adjust the contrast ratio by adjust the white level or brightness of a pixel. In an example, a viewing threshold level may be a contrast ratio for a pixel at which the pixel is legible by an observer. In an embodiment, the viewing threshold level, such as brightness:darkness, is any suitable ratio that prevents a pixel from being legible including 5:1 or 3:1.

In an example, the brightness of pixels 220 within the secondary field of view may be reduced in any suitable manner. For example, GPU 206 and/or TCON 210 may control transmissibility of one or more vertical pixel columns, such as vertical pixel columns 302, 304, 306, 308, 310, 312, 314, and 316 of FIG. 3, to reduce the viewable brightness of pixels 220 behind the one or more vertical pixel columns. In an example, GPU 206 and/or TCON 210 may control, via one or more voltage sources, a voltage provided to the one or more vertical pixel columns. The voltage provided to the vertical pixel columns changes the transmissibility of the pixel columns as described with respect to FIG. 3 below.

In an example, GPU 206 may decrease the legibility of pixels 220 within the secondary field of view by providing the image for display to pixel adjustment controller 208. In this example, pixel adjustment controller 208 may receive data indicating pixels 220 within the secondary field of view and may utilize this data to reduce the legibility of the pixels within the secondary field of view. For example, pixel adjustment controller 208 may perform one or more suitable operations to lower a contrast ratio of pixels 220 within the secondary field of view. In an example, pixel adjustment controller 208 may drop or lower a black or color component of pixels within the secondary field of view to lower the contrast ratio of these pixels.

Therefore, GPU 206 and/or TCON 210 may perform one or more operations to dynamically adjust the contrast ratio of pixels 220 within the secondary field of view to a level below the viewing threshold level to prevent the secondary user from being able to view the image on display device 202. Additionally, GPU 206 and/or TCON 210 may perform one or more suitable operations to increase brightness within the primary field of view to improve the legibility of images on display device 202 by the primary observer.

In certain examples, GPU 206 and/or TCON 210 may utilize ambient light around display device 202 to determine a brightness for pixels 220 within the secondary field of view. In an example, processor 204 may receive an ambient light level from ambient light sensor 216, and may provide the ambient light to GPU 206 and/or TCON 210. GPU 206 and/or TCON 210 may adjust the brightness of pixels 220 within the secondary field of view based on the ambient light level. In an example, GPU 206 and/or TCON 210 may adjust a brightness level of a pixel 220 to be substantially equal to the brightness level of the ambient light. However, GPU 206 and/or TCON 210 may further decrease the legibility of a pixel 220 may decreasing the brightness of the pixel to any suitable level below the ambient brightness level.

Figure 3:
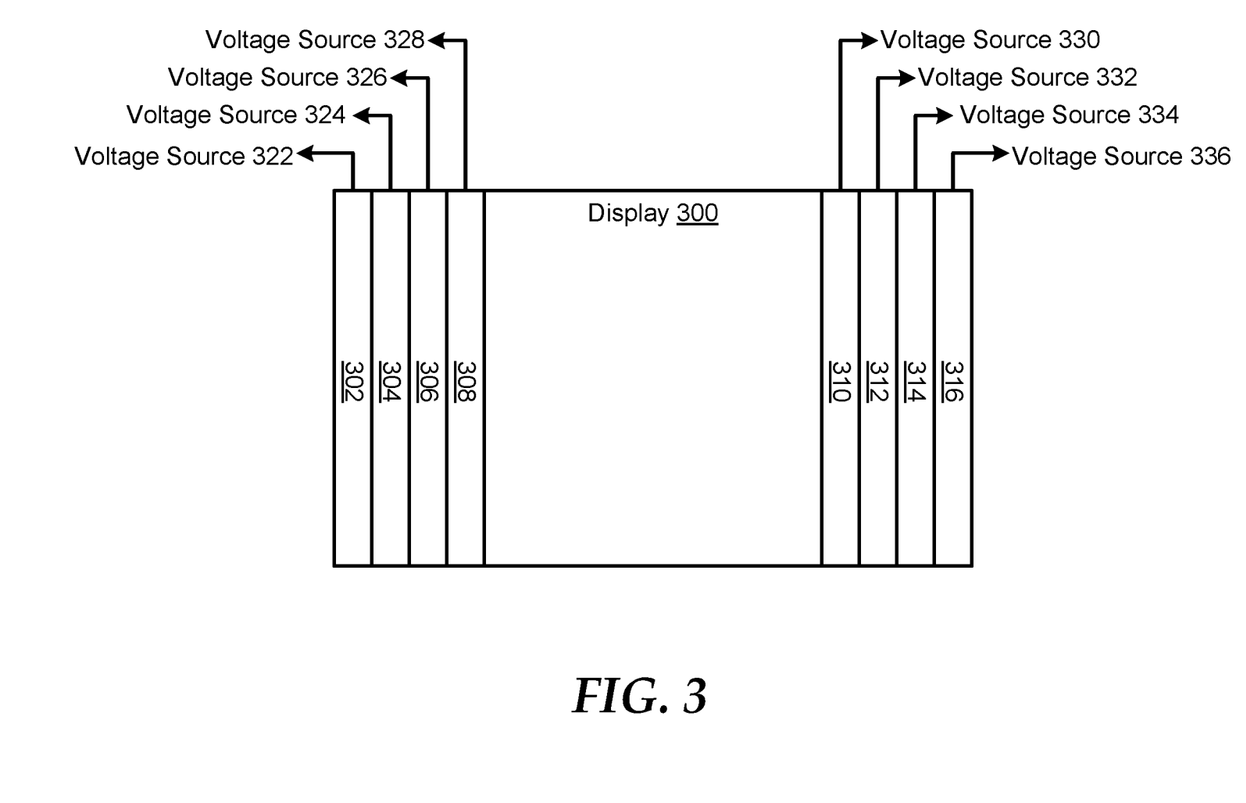
FIG. 3 is a diagram of a display including multiple vertical pixel columns to dynamically change a legibility of pixels on a display screen of an information handling system according to at least one embodiment of the disclosure.

FIG. 3 is a diagram of a display 300 including multiple vertical pixel columns 302, 304, 306, 308, 310, 312, 314, and 316 (vertical pixel columns 302-316) to dynamically change a legibility of pixels on display 218 of information handling system 200 according to at least one embodiment of the disclosure. Vertical pixel columns 302-316 may be located in any suitable sections of display 300 to dynamically adjust legibility of display 218 of display device 202. For example, vertical pixel columns 302-308 may be located on a left side of display 300, and vertical pixel columns 310-316 may be located on a right side of the display. In an example display 300 may be stacked on top of display 218, such that a change in transmissibility of one or more of vertical pixel columns 302-316 may dynamically change the legibility of pixels 220 below or behind the corresponding vertical pixel columns. In an example, display 300 may include any suitable number of vertical pixel columns without varying from the scope of this disclosure.

In an example, vertical pixel columns 302-316 may include non-cubic crystal structures. In one example, the non-cubic crystal structures may restrict light emissions of display device 202. For instance, the non-cubic crystal structures may be utilized in absorbing and/or diffusing at least a portion of light emissions of display device 202. In another example, one or more of vertical pixel columns 302-316 may include liquid crystals. In one instance, the liquid crystals may be utilized in absorbing and/or diffusing at least a portion of light emissions of display device 202.

In certain examples, one or more of vertical pixel columns 302-316 may include polymer dispersed liquid crystals (PDLC). For example, the PDLC of vertical pixel column may restrict and/or direct light emissions of display device 202. Each of vertical pixel columns 302-316 may be coupled to a different one of voltage sources 322, 324, 326, 328, 330, 332, 334, and 336 (voltage sources 322-336). Voltage sources 322-336 may be utilized by processor 204, GPU 206, and/or TCON 210 to control the transmissibility of vertical pixel columns 302-316. In an example, when no voltage, such as zero voltage, is applied to the PDLC of one or more of vertical pixel columns 302-316, the liquid crystals of the PDLC may be randomly arranged, which may scatter light emissions of display device 202. For example, the PDLC of one or more of vertical pixel columns 302-316 may absorb and/or diffuse at least a portion of light emissions of display device 202. In an example, one or more voltages, greater than a zero voltage, may be applied to one or more of vertical pixel columns 302-316. For example, when applying the one or more voltages, greater than a zero voltage, to one or more of vertical pixel columns 302-316, an electrical current may pass through the PDLC, which may align crystals of the PDLC along parallel axes that may permit light emissions of display device 202 to pass through and/or be directed. In one instance, one or more degrees of transparency of light emissions of display device 202 may be associated with respective the one or more applied voltages to one or more of vertical pixel columns 302-316.

In an example, lower voltages applied to one or more of vertical pixel columns 302-316 may align a few liquid crystals of the PDLC, which may permit a small portion of light emissions of display device 202. In an example, as voltages applied to one or more of vertical pixel columns 302-316 increase, fewer of the liquid crystals of the PDLC may be out of alignment, which may permit an increase in permitted light emissions of display device 202. In one example, one or more voltages applied to one or more of vertical pixel columns 302-316 may be utilized to control one or more amounts of light emissions of display device 202. While the operation of the vertical pixel columns 302-316 has been described with respect to a voltage control for transmissibility, the transmissibility of the vertical pixel columns may alternatively be controlled by current sources and a current provided to each of the vertical pixel columns without varying from the scope of the disclosure. In various examples, the individual pixels within the vertical pixel columns 302-316 may be controlled at any suitable level of granularity including, but not limited to, each pixel independently, an entire column of pixels, and multiple columns of pixels. In an example, utilization of vertical pixel columns 302-316 to dynamically adjust legibility of images on a display device will be described with respect to FIGS. 2, 4, and 5 below.

Figure 4:
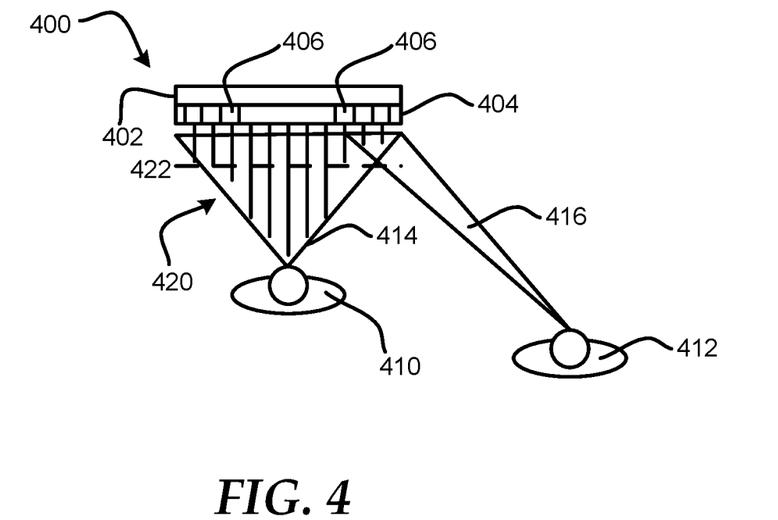
FIGS. 4 and 5 are top views of a display device including two displays according to at least one embodiment of the disclosure.
Figure 5:
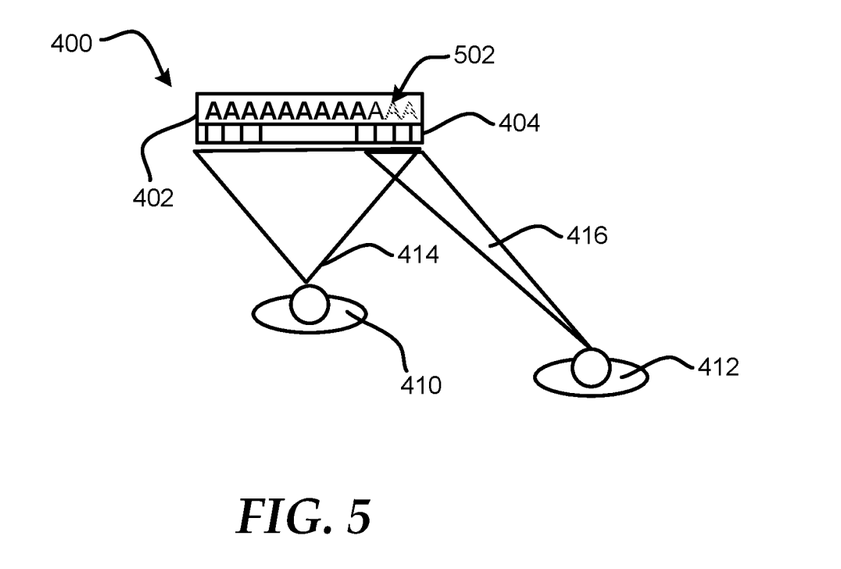

FIGS. 4 and 5 show a display device 400 including two displays 402 and 404 according to at least one embodiment of the disclosure. In an example, display device 400 may be any suitable display device including display device 202 of FIG. 2. Similarly, display 402 may be any suitable display to provide an image to an observer including display 218, and display 404 may be any suitable display including display 300. As illustrated, display 404 may be stacked on display 402, and display 404 may include one or more vertical pixel columns 406. In an example, vertical pixel columns 406 may be any suitable vertical pixel columns including vertical pixel columns 302-316. In an example, display device 400 may be incorporated in any suitable information handling system, such as information handling system 100 of FIG. 1, or information handling system 200 of FIG. 2. In certain examples, display 400 may be coupled to any suitable components, such as a processor, a GPU, a pixel adjustment controller, a TCON, a camera, global backlighting, and an ambient light sensor, to enable the legibility of pixels within display 402 to be dynamically adjusted. Therefore, the operation of display device 400 will be described with reference to processor 204, GPU 206, pixel adjustment controller 208, TCON 210, camera 212, global backlighting 214, and ambient light sensor 216 even though these components are not shown in FIGS. 4 and 5 for clarity.

While display device 400 is operating in a privacy mode, camera 212 may be utilized in any suitable manner to determine whether multiple observers, such as observers 410 and 412, are looking at display 402 and the locations of the observers. For example, camera 212 may provide images to processor 204, and these images may include observers 410 and 412. Processor 204 may identify observer 410 as a primary observer and observer 412 as a secondary observer.

In response to primary observer 410 and secondary observer 412 being identified, processor 204 may performed one or more operations to determine a field of view for the observers. In an example, if primary observer 410 is located directly in front of display device 400, processor 204 may determine that a primary field of view 414 for the primary observer begins in the center of the display device and extends towards the edges of the display device a predetermined distance including, but not limited to, the entire display device. In certain examples, processor 204 may utilize metadata associated with the captured image from camera 212 to determine or calculate a viewing angle for second observer 412 to display device 400. Processor 204 may utilize the distance and angle of second observer 412 to calculate, via any suitable manner, a secondary field 416 of view for the secondary observer. Additionally, processor 204 may utilize the distance and angle of second observer 412 to calculate, via any suitable manner, a portion or field of view on display device 400 with a contrast of the image on display 402 fades to a point that the second observer cannot view the image. For example, based on the viewing angle of second observer 412, processor 204 may calculate that any portion of the image on display 402 located outside of the secondary field 416 already has a contrast level that prevents the second observer from being able to view the image without changes being made to the contrast level.

In an example, processor 204 may determine a first set of pixels on display device 400 within primary field of view 414 and determine a second set of the pixels within secondary field of view 416. In certain examples, a contrast ratio for pixels of the second set of pixels may be dynamically reduced to decrease the legibility of an image on display device 400 within portions of the display device that are outside of primary field of view 414, such as within secondary field of view 416.

In an example, GPU 206 and/or TCON 210 may perform a dynamic legibility calculation by one or more suitable operations. For example, GPU 206 and/or TCON 210 may determine a current contrast ratio for pixels within secondary field of view 416, and determine a legibility adjustment for the pixels to reduce the contrast ratio to a ratio below a threshold level. As illustrated, different portions of an image on display 402 may have different viewable intensities 420 based on dynamic adjustments of legibility in the different field of views 414 and 416. In an example, the longer the line illustrating an intensity 420 in FIG. 2, the higher the intensity level.

In an example, the brightness of pixels within secondary field of view 416 may be reduced in any suitable manner. For example, GPU 206 and/or TCON 210 may control transmissibility of one or more vertical pixel columns 406 within display 404 to reduce the viewable brightness of pixels behind the one or more vertical pixel columns. In an example, GPU 206 and/or TCON 210 may control a voltage provided to the one or more vertical pixel columns 406 to dynamically change the transmissibility of the vertical pixel columns. For example, a voltage provided to vertical pixel column 406 at an edge of secondary field of view 416 may be lowered a first amount to decrease the transmissibility of the vertical pixel column to a first level. In an example, the first transmissibility level may reduce a brightness intensity viewable by the secondary observer 412 to a level below a threshold level 422. In certain examples, GPU 206 and/or TCON 210 may further reduce an amount of voltage provided to each subsequent vertical pixel column 406 to further reduce the contrast ratio and viewable intensity 420 of pixels within secondary field of view 416 as shown in FIG. 4.

Referring now to FIG. 5, GPU 206 may decrease the legibility of pixels within secondary field of view 416 by providing the image for display to pixel adjustment controller 208. In this example, pixel adjustment controller 208 may receive data indicating pixels within secondary field of view 416 and may utilize this data to reduce the legibility of the pixels within the secondary field of view. For example, pixel adjustment controller 208 may perform one or more suitable operations to lower a contrast ratio of pixels within secondary field of view 416. In an example, pixel adjustment controller 208 may drop or lower a black or color component of pixels, such as pixels 502, within secondary field of view 416 to lower the contrast ratio of these pixels as illustrate in FIG. 5.

Therefore, GPU 206 and/or TCON 210 may perform one or more operations to dynamically adjust the contrast ratio of pixels within secondary field of view 416 to a level below viewing threshold level 422 to prevent secondary observer 412 from being able to view the image on display 402 of display device 400. Additionally, GPU 206 and/or TCON 210 may perform one or more suitable operations to increase brightness within primary field of view 414 to improve the legibility of images on display 402 of display device 400 by primary observer 410.

Thus, GPU 206 and/or TCON 210 may lower the contrast ratio in any suitable manner including but not limited to adjusting coefficients applied to vertical pixel columns 406 or using an interpolation of look-up tables within pixel adjustment controller 208 to adjust a black or color component of a pixel. In an example, the operations performed by processor 204, described above, may be executed by GPU 206 or TCON 210 without varying from the scope of the disclosure. In an example, the vertical pixel columns 406 may be formed within display 404 as horizontal pixel rows to prevent a second observer from viewing display 400 from above or below as described with respect to FIGS. 6 and 7 below.

Figure 6:
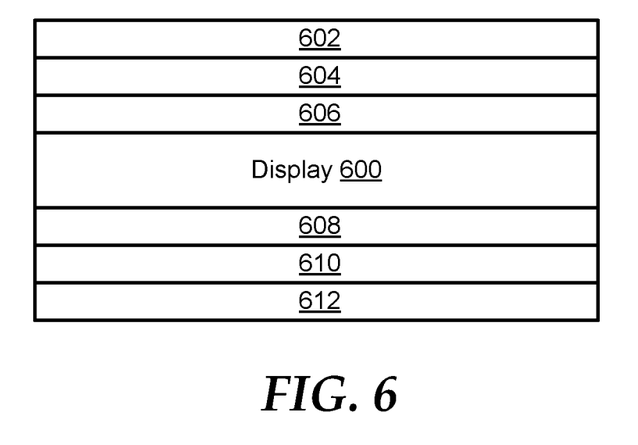
FIG. 6 is a diagram of a display including multiple horizontal pixel rows to dynamically change a legibility of pixels on a display screen of an information handling system according to at least one embodiment of the disclosure.

FIG. 6 is a diagram of a display 600 including multiple horizontal pixel rows 602, 604, 606, 608, 610, and 612 (horizontal pixel rows 602-612) to dynamically change a legibility of pixels on a display of a display device, such as display 218 of information handling system 200 according to at least one embodiment of the disclosure. Horizontal pixel rows 602-612 may be located in any suitable sections of display 600 to dynamically adjust legibility of display 218 of display device 202. For example, horizontal pixel rows 602-606 may be located on a top portion of display 600, and horizontal pixel rows 608-612 may be located on a bottom portion of the display. In an example display 600 may be stacked on top of display 218, such that a change in transmissibility of one or more of horizontal pixel rows 602-612 may dynamically change the legibility of pixels 220 below or behind the corresponding horizontal pixel rows. In an example, display 600 may include any suitable number of horizontal pixel rows without varying from the scope of this disclosure.

In an example, horizontal pixel rows 608-612 may include non-cubic crystal structures. In one example, the non-cubic crystal structures may restrict light emissions of display device 202. For instance, the non-cubic crystal structures may be utilized in absorbing and/or diffusing at least a portion of light emissions of display device 202. In another example, one or more of horizontal pixel rows 608-612 may include liquid crystals. In one instance, the liquid crystals may be utilized in absorbing and/or diffusing at least a portion of light emissions of display device 202.

In certain examples, one or more of horizontal pixel rows 608-612 may include polymer dispersed liquid crystals (PDLC). For example, the PDLC of vertical pixel column may restrict and/or direct light emissions of display device 202. Each of horizontal pixel rows 608-612 may be coupled to a different one of voltage sources as described above with respect to FIG. 3. The voltage sources may be utilized by processor 204, GPU 206, and/or TCON 210 to control the transmissibility of horizontal pixel rows 608-612. Additionally, the transmissibility of horizontal pixel rows 608-612 may alternatively be controlled by current sources and a current provided to each of the horizontal pixel rows without varying from the scope of the disclosure. In various examples, the individual pixels within the horizontal pixel rows 608-612 may be controlled at any suitable level of granularity including, but not limited to, each pixel independently, an entire column of pixels, and multiple columns of pixels.

Figure 7:
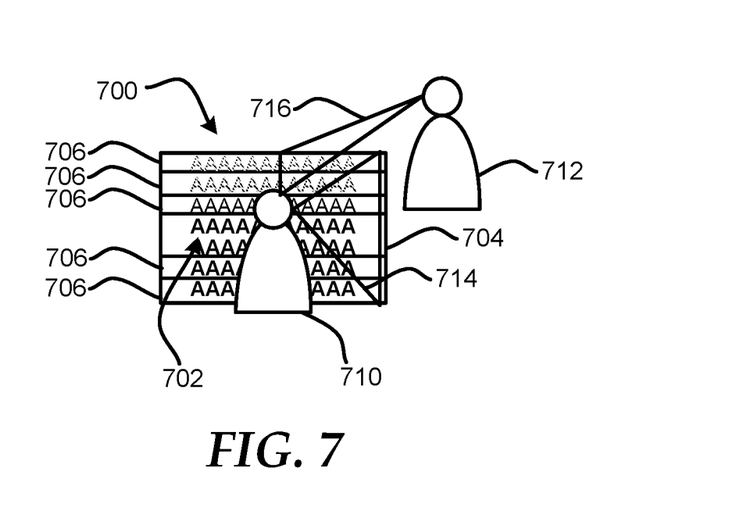
FIG. 7 is a view of a display device including two displays according to at least one embodiment of the disclosure.

FIG. 7 shows a display device 700 including two displays 702 and 704 according to at least one embodiment of the disclosure. In an example, display device 700 may be any suitable display device including display device 202 of FIG. 2. Similarly, display 702 may be any suitable display to provide an image to an observer including display 218, and display 704 may be any suitable display including display 600. As illustrated, display 704 may be stacked on display 702, and display 704 may include one or more horizontal pixel rows 706. In an example, horizontal pixel rows 706 may be any suitable horizontal pixel rows including horizontal pixel rows 602-612. In an example, display device 700 may be incorporated in any suitable information handling system, such as information handling system 100 of FIG. 1, or information handling system 200 of FIG. 2. In certain examples, display 700 may be coupled to any suitable components, such as a processor, a GPU, a pixel adjustment controller, a TCON, a camera, global backlighting, and an ambient light sensor, to enable the legibility of pixels within display 702 to be dynamically adjusted. Therefore, the operation of display device 700 will be described with reference to processor 204, GPU 206, pixel adjustment controller 208, TCON 210, camera 212, global backlighting 214, and ambient light sensor 216 even though these components are not shown in FIG. 7 for clarity.

While display device 700 is operating in a privacy mode, camera 212 may be utilized in any suitable manner to determine whether multiple observers, such as observers 710 and 712, are looking at display 702 and the locations of the observers. For example, camera 212 may provide images to processor 204, and these images may include observers 710 and 712. Processor 204 may identify observer 710 as a primary observer and observer 712 as a secondary observer. In an example, observers 710 and 712 may be looking down on display 700, as shown in FIG. 7, or looking up at the display.

In response to primary observer 710 and secondary observer 712 being identified, processor 204 may performed one or more operations to determine a field of view for the observers. In an example, if primary observer 710 is located directly in front of or slightly above or below a mid-line of display device 700, processor 204 may determine that a primary field of view 714 for the primary observer begins in the center of the display device and extends towards the edges of the display device a predetermined distance including, but not limited to, the entire display device. In certain examples, processor 204 may utilize metadata associated with the captured image from camera 212 to determine or calculate a viewing angle for second observer 712 to display device 700. Processor 204 may utilize the distance and angle of second observer 712 to calculate, via any suitable manner, a secondary field 716 of view for the secondary observer. Additionally, processor 204 may utilize the distance and angle of second observer 712 to calculate, via any suitable manner, a portion or field of view on display device 700 with a contrast of the image on display 702 fades to a point that the second observer cannot view the image. For example, based on the viewing angle of second observer 712, processor 204 may calculate that any portion of the image on display 702 located outside of the secondary field 716 already has a contrast level that prevents the second observer from being able to view the image without changes being made to the contrast level.

In an example, processor 204 may determine a first set of pixels on display device 700 within primary field of view 714 and determine a second set of the pixels within secondary field of view 716. In certain examples, a contrast ratio for pixels of the second set of pixels may be dynamically reduced to decrease the legibility of an image on display device 700 within portions of the display device that are outside of primary field of view 714, such as within secondary field of view 716.

In an example, GPU 206 and/or TCON 210 may perform a dynamic legibility calculation by one or more suitable operations. For example, GPU 206 and/or TCON 210 may determine a current contrast ratio for pixels within secondary field of view 716, and determine a legibility adjustment for the pixels to reduce the contrast ratio to a ratio below a threshold level.

In an example, the brightness of pixels within secondary field of view 716 may be reduced in any suitable manner. For example, GPU 206 and/or TCON 210 may control transmissibility of one or more horizontal pixel rows 706 within display 704 to reduce the viewable brightness of pixels behind the one or more vertical pixel columns. In an example, GPU 206 and/or TCON 210 may control a voltage or current provided to the one or more horizontal pixel rows 706 to dynamically change the transmissibility of the vertical pixel columns. For example, a voltage provided to horizontal pixel row 706 at an edge of secondary field of view 716 may be lowered a first amount to decrease the transmissibility of the vertical pixel column to a first level. In an example, the first transmissibility level may reduce a brightness intensity viewable by the secondary observer 712 to a level below a threshold level. In certain examples, GPU 206 and/or TCON 210 may further reduce an amount of voltage provided to each subsequent horizontal pixel row 706 to further reduce the contrast ratio and viewable intensity of pixels within secondary field of view 716.

In an example, GPU 206 may decrease the legibility of pixels within secondary field of view 716 by providing the image for display to pixel adjustment controller 208. In this example, pixel adjustment controller 208 may receive data indicating pixels within secondary field of view 716 and may utilize this data to reduce the legibility of the pixels within the secondary field of view. For example, pixel adjustment controller 208 may perform one or more suitable operations to lower a contrast ratio of pixels within secondary field of view 716. In an example, pixel adjustment controller 208 may drop or lower a black or color component of pixels, such as pixels on display 702, within secondary field of view 716 to lower the contrast ratio of these pixels.

Therefore, GPU 206 and/or TCON 210 may perform one or more operations to dynamically adjust the contrast ratio of pixels within secondary field of view 716 to a level below viewing threshold level to prevent secondary observer 712 from being able to view the image on display 702 of display device 700. Additionally, GPU 206 and/or TCON 210 may perform one or more suitable operations to increase brightness within primary field of view 714 to improve the legibility of images on display 702 of display device 700 by primary observer 710.

Thus, GPU 206 and/or TCON 210 may lower the contrast ratio in any suitable manner including but not limited to adjusting coefficients applied to horizontal pixel rows 706 or using an interpolation of look-up tables within pixel adjustment controller 208 to adjust a black or color component of a pixel. In an example, the operations performed by processor 204, described above, may be executed by GPU 206 or TCON 210 without varying from the scope of the disclosure.

Figure 8:
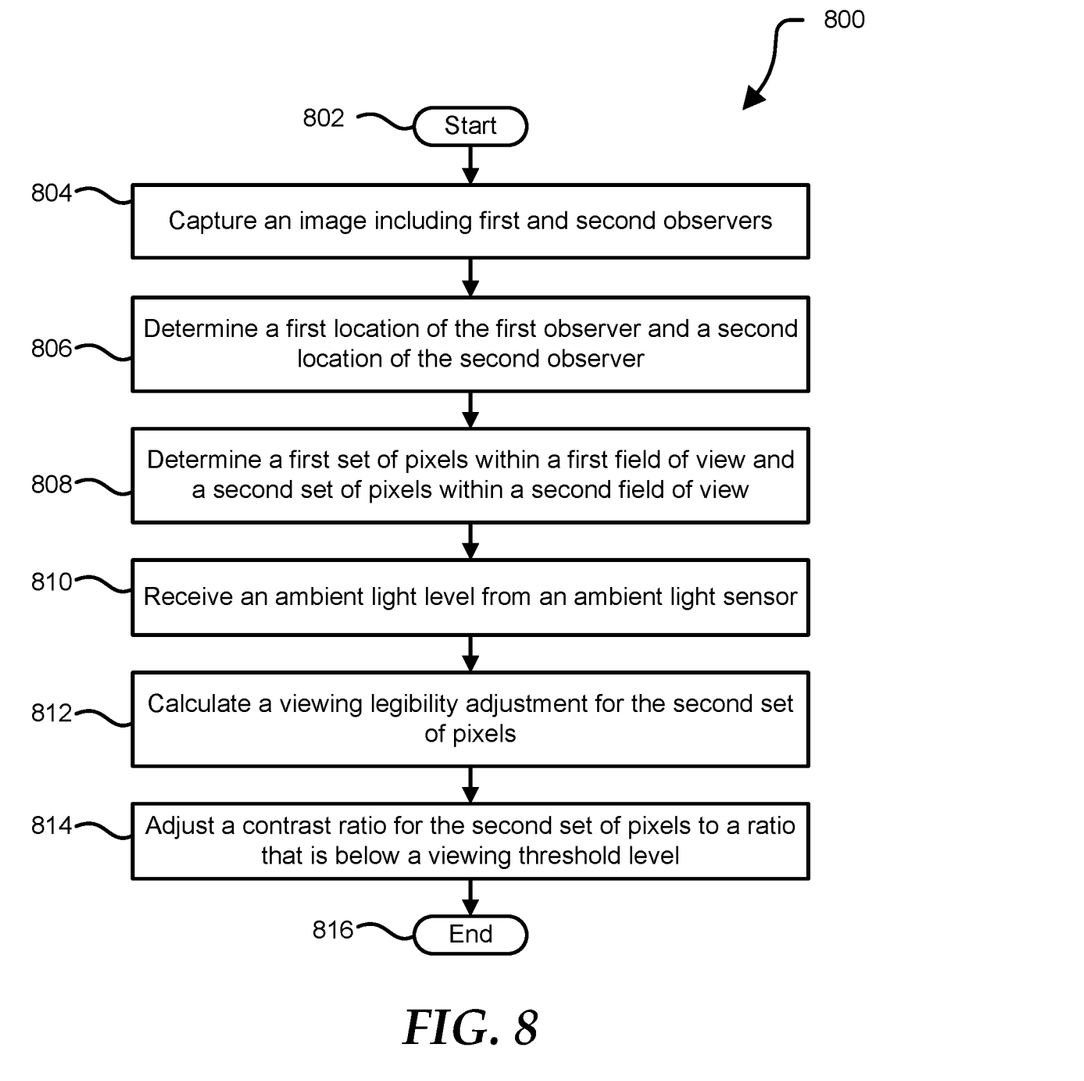
FIG. 8 is a flow diagram of a method for dynamically adjusting a legibility of different portions of pixels in a display device according to at least one embodiment of the present disclosure.

FIG. 8 shows a method for dynamically adjusting a legibility of different portions of pixels in a display device according to at least one embodiment of the disclosure, starting at block 802. It will be readily appreciated that not every method step set forth in this flow diagram is always necessary, and that certain steps of the methods may be combined, performed simultaneously, in a different order, or perhaps omitted, without varying from the scope of the disclosure. FIG. 8 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 8.

At block 804, an image is captured with first and second observers within the image. In an example, the first observer may be identified as a primary observer, and the second observer may be identified as a secondary observer. At block 806, a first location of the first observer and a second location of the second observer are determined. In an example, the first location may be utilized to determine a first field of view for the first observer, and the second location may be utilized to determine a second field of view for the second observer.

Based on the first and second location, a first set of pixels within the first field of view and a second set of pixels within the second field of view are determined at block 808. At block 810, an ambient light level is received from an ambient light sensor. At block 812, a viewing legibility adjustment is calculated for the second set of pixels. In an example, a legibility adjustment for the pixels may be utilized to reduce a contrast ratio to a ratio below a threshold level. In certain examples, the legibility adjustment may be calculated, in part, on the ambient light level. For example, the contrast ratio may be reduce to further decrease the legibility of one or more pixels by decreasing the brightness of the pixels to any suitable level below the ambient brightness level. Based on the viewing legibility adjustment, a contrast ratio for the second set of pixels is adjusted to a ratio that is below a viewing threshold level at block 814, and the method ends at block 816. In an embodiment, a contrast ratio is a ratio of brightness to dark within a pixel. For example, the contrast ratio may be calculated by dividing a white level of a pixel by the black level of the pixel. In an embodiment, the black level may be set to a predetermined level that cannot be changed. Thus, the contrast ratio may be adjusted by adjusting the white level or brightness of a pixel. In an example, a viewing threshold level may be a contrast ratio for a pixel at which the pixel is legible by an observer. In an embodiment, the viewing threshold level, such as brightness:darkness, is any suitable ratio that prevents a pixel from being legible including 5:1 or 3:1. In certain examples, the contrast ratio may be adjusted in any suitable manner including adjusting coefficients applied to vertical pixel columns to change a transmissibility of the vertical pixel columns, and using an interpolation of look-up tables within pixel adjustment controller to adjust a black or color component of a pixel.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display device;
   an ambient light sensor to detect an ambient brightness level;
   a camera to capture an image including first and second observers in a field of view in front of the display device; and
   a processor to communicate with the camera, with the ambient light sensor, and with the display device, the processor to determine a first location of the first observer, to determine a second location of the second observer, to determine first and second sets of pixels of the display device based on the first and second locations, wherein the first set of pixels are located within a primary field of view for the first observer, and the second set of pixels are located within a second field of view for the second observer, to receive the ambient brightness level from the ambient light sensor, to calculate a viewing legibility adjustment for the second set of pixels based on the ambient brightness level, and to adjust, based on the viewing legibility adjustment, a contrast ratio for the second set of pixels to below a viewing threshold level.

2. The information handling system of claim 1, further comprising:
   a first display of the display device to generate an image viewable by the first observer; and
   a second display of the display device including a plurality of vertical pixel columns, wherein the vertical pixel columns control an amount of light output from the display device.

3. The information handling system of claim 2, wherein a transmissibility of each of the vertical pixel columns are controlled by a voltage level applied across each of the vertical pixel columns.

4. The information handling system of claim 3, wherein the processor further to calculate a dynamic legibility off angle based on the second location of the second observer, and to determine, based on the dynamic legibility off angle, a first transmissibility of a first vertical pixel column, a second transmissibility of a second vertical pixel column, and a third transmissibility of a third vertical pixel column.

5. The information handling system of claim 1, further comprising:
   pixel adjustment circuitry to communicate with a display of the display device and with the processor, the pixel adjustment circuitry to lower a black or color component for pixels within the second set of pixels, wherein the lowering of the black or color component decreases the contrast ratio for the pixels from a first contrast ratio to a second contrast ratio, wherein the second contrast ratio is below the viewing threshold level.

6. The information handling system of claim 1, wherein the processor is a graphics processing unit of the information handling system.

7. The information handling system of claim 1, wherein the processor is a timing controller of the information handling system.

8. A method comprising:
   capturing an image including first and second observers in a field of view in front of a display device of an information handling system;
   based on the captured image, determining, by a processor, a first location of the first observer and a second location of the second observer;
   based on the first and second locations, determining first and second sets of pixels of the display device, wherein the first set of pixels is located within a primary field of view for the first observer, and the second set of pixels is located within a second field of view for the second observer;
   detecting an ambient brightness level;
   providing the ambient brightness level to the processor;
   calculating, by the processor, a viewing legibility adjustment for the second set of pixels based on the ambient brightness level; and
   based on the viewing legibility adjustment, adjusting a contrast ratio for the second set of pixels to below a viewing threshold level.

9. The method of claim 8, further comprising:
   generating, at a first display of the display device, an image viewable by the first observer; and
   controlling a transmissibility of a plurality of vertical pixel columns within a second display of the display device, wherein the vertical pixel columns include first, second, and third vertical pixel columns.

10. The method of claim 9, further comprising:
    based on the second location of the second observer, calculating a dynamic legibility off angle and to determine; and based on the dynamic legibility off angle, calculating a first transmissibility of a first vertical pixel column of a plurality of a second display, a second transmissibility of a second vertical pixel column, and a third transmissibility of a third vertical pixel column.

11. The method of claim 9, wherein the transmissibility of each of the vertical pixel columns are controlled by a voltage level applied across each of the vertical pixel columns.

12. The method of claim 8, further comprising:
lowering a black or color component for pixels within the second set of pixels, wherein the drop of the black or color component decreases the contrast ratio for the pixels from a first contrast ratio to a second contrast ratio, wherein the second contrast ratio is below the viewing threshold level.

13. A non-transitory computer-readable medium including code that when executed by a processor causes the processor to perform a method for adjusting legibility of an image on a display device of an information handling system, the method comprising:
capturing an image including first and second observers in a field of view in front of the display device of the information handling system;
based on the captured image, determining a first location of the first observer and a second location of the second observer;
based on the first and second locations, determining first and second sets of pixels of the display device, wherein the first set of pixels is located within a primary field of view for the first observer, and the second set of pixels is located within a second field of view for the second observer;
detecting an ambient brightness level;
utilizing the ambient brightness level to calculate a viewing legibility adjustment for the second set of pixels; and
based on the viewing legibility adjustment for the second set of pixels, adjusting a contrast ratio for the second set of pixels to below a viewing threshold level.

14. The non-transitory computer-readable medium of claim 13, further comprising:
generating, on a first display of the display device, an image viewable by the first observer; and
controlling a transmissibility of a plurality of vertical pixel columns within a second display of the display device, wherein the vertical pixel columns include first, second, and third vertical pixel columns.

15. The non-transitory computer-readable medium of claim 14, further comprising:
based on the second location of the second observer, calculating a dynamic legibility off angle and to determine; and
based on the dynamic legibility off angle, calculating a first transmissibility of a first vertical pixel column of a plurality of a second display, a second transmissibility of a second vertical pixel column, and a third transmissibility of a third vertical pixel column.

16. The non-transitory computer-readable medium of claim 14, wherein the transmissibility of each of the vertical pixel columns are controlled by a voltage level applied across each of the vertical pixel columns.

17. The non-transitory computer-readable medium of claim 13, further comprising:
lowering, by pixel adjustment circuitry, a black or color component for pixels within the second set of pixels, wherein the drop of the black or color component decreases the contrast ratio for the pixels from a first contrast ratio to a second contrast ratio, wherein the second contrast ratio is below the viewing threshold level.

* * * * *